(12) United States Patent
Ban

(10) Patent No.: US 7,007,022 B2
(45) Date of Patent: Feb. 28, 2006

(54) DIGITAL DATA SEARCHING APPARATUS AND AN IMAGE DISPLAY APPARATUS

(75) Inventor: Shinichi Ban, Sakai (JP)

(73) Assignee: Minolta Co., Ltd., Osaka (JP)

( * ) Notice: Subject to any disclaimer, the term of this patent is extended or adjusted under 35 U.S.C. 154(b) by 457 days.

(21) Appl. No.: 10/428,781

(22) Filed: May 5, 2003

(65) Prior Publication Data

US 2003/0212659 A1   Nov. 13, 2003

(30) Foreign Application Priority Data

May 10, 2002  (JP) .............................. 2002-135442

(51) Int. Cl.
*G06F 17/30*  (2006.01)
(52) U.S. Cl. ........................... 707/7; 707/104.1; 396/9
(58) Field of Classification Search ................... 707/3, 707/5, 7, 104.1; 396/9
See application file for complete search history.

(56) References Cited

U.S. PATENT DOCUMENTS 5,802,361 A *  9/1998  Wang et al. ................. 382/217
6,564,206 B1 *  5/2003  Ikeda .............................. 707/3
6,886,010 B1 *  4/2005  Kostoff ........................... 707/3

FOREIGN PATENT DOCUMENTS

| JP | 07-282087 | | 10/1995 |
|---|---|---|---|
| JP | 10-301938 | | 11/1998 |
| JP | 10301938 | * | 11/1998 |
| JP | 2000-217057 | | 8/2000 |
| JP | 2001-092825 A | | 4/2001 |
| JP | 2001-228528 | | 8/2001 |
| JP | 2001-228528 A | | 8/2001 |

OTHER PUBLICATIONS

S. Geffner et al. "Browsing large digital library collection using classification hierarchies", ACM Press, 1999.*

* cited by examiner

Primary Examiner—Frantz Coby
Assistant Examiner—Haythim Alaubaidi
(74) Attorney, Agent, or Firm—McDermott Will & Emery LLP

(57) ABSTRACT

A digital data searching apparatus is provided with a data storage for storing digital data and first and second attribute data representing conditions on which the respective digital data were created; a first classifying device for classifying the digital data into i sets based on the first attribute data; a second classifying device for classifying the digital data into j sets based on the second attribute data; a first selecting device for selecting one set from the i sets upon receiving an input from outside; a second selecting device for selecting one set from the j sets upon receiving an input from outside; an extracting device for calculating a product set of the set selected by the first selecting device and the set selected by the second selecting device, and a display controller for displaying the digital data included in the product set on a display device. Digital data satisfying a specified condition can be efficiently searched from a plurality of digital data.

20 Claims, 12 Drawing Sheets

FIG.4

| | LA | | LN | | PN |
|---|---|---|---|---|---|
| | LATITUDE | | LONGITUDE | | NAME OF PLACE |
| | 33.29.46 | | 134.40.40 | | MAKUHARI MESSE |
| | 33.29.05 | | 135.47.48 | | TOKYO BIG SITE |
| | 33.59.05 | | 135.47.48 | | SHINJUKU STATION |
| | ⋮ | | ⋮ | | ⋮ |

DIGITAL DATA SEARCHING APPARATUS AND AN IMAGE DISPLAY APPARATUS

This application is based on patent application No. 2002-135442 filed in Japan, the contents of which are hereby incorporated by references.

BACKGROUND OF THE INVENTION

This invention relates to a digital data searching apparatus for searching digital data satisfying a specified condition from a plurality of digital data to display a search result on a display device, and an image display apparatus.

In recent years, digital equipments such as digital cameras for obtaining an object image in the form of a digital image and measuring apparatuses for obtaining various kinds of digital data have come into wide use. Since the capacity of recording mediums such as HDD (hard disk drive) for storing digital data obtained by these digital equipments has been increased, a huge number of digital data can be stored in the same recording medium.

On the other hand, as the number of digital data stored in the recording medium increases, it becomes difficult to search a desired digital data. Thus, there has been a need for a digital data searching apparatus capable of efficiently searching desired digital data from those stored in the recording medium, and various proposals have been made to meet such a need.

For example, Japanese Unexamined Patent Publication No. 2001-228528 discloses an image administration method for classifying image data based on the date of photographing and the position of photographing. This method hierarchically classifies the image data by comparing at least one of differences between dates of photographing and differences between positions of photographing with a threshold value. The use of this image administration method enables realization of a digital data searching apparatus capable of searching digital data satisfying a specified condition with definite precision.

However, search by the photographing position data is difficult in the case of hierarchically classifying the image data by comparing the differences between the date data with the threshold value, whereas search by the photographing date data is difficult in the case of hierarchically classifying the image data by comparing the differences between the photographing position data with the threshold value. Thus, the image data satisfying the specified condition could not be efficiently searched from a plurality of image data.

Further, in the case of hierarchically classifying the image data by comparing both the difference between date data and the differences between the photographing position data with the threshold values, data at least one of the date data and the position data of which are similar are classified into the same group. For example, image data obtained by photographing during a tour in which participants travel in a wide area within a short period using a high-speed means of transportation such as an airplane may be classified into the same group even through they are obtained by photographing conducted at different places. In such a case, search by the photographing position data is difficult and the image data satisfying a specified condition cannot be efficiently searched from a plurality of image data. Such a problem occurs not only in the case of image data, but also in the case of other forms of digital data such as sound data and vibration wave data.

SUMMARY OF THE INVENTION

It is an object of the present invention to provide a digital data searching apparatus and an image display apparatus which are free from the problems residing in the prior art.

It is another object of the present invention to provide a digital data searching apparatus and an image display apparatus which can efficiently search a digital data satisfying a specified condition from a plurality of digital data and display a searched digital data.

According to an aspect of the present invention, a digital data searching apparatus comprises: a data storage device for storing a plurality of digital data each having first attribute data and second attribute data; a first classifier for classifying the plurality of digital data into a specified number of sets based on their respective first attribute data; a second classifier for classifying the plurality of digital data into a specified number of sets based on their respective second attribute data; a first selector for selecting a set from the sets; a second selector for selecting a set from the sets; an extractor for calculating a product set of the set selected by the first selector and the set selected by the second selector; and a display controller communicatable with a display device for controlling the display device to display digital data included in the product set.

Also, according to another aspect of the present invention, an image display apparatus comprises: a storage device for storing a plurality of image data each having photographing time data and photographing position data; a photographing time classifier for classifying the plurality of image data into a specified number of sets based on their respective photographing time data; a photographing position classifier for classifying the plurality of image data into a specified number of sets based on their respective photographing position data; a photographing time selector for selecting a set from the specified number of sets classified based on the photographing time data; a photographing position selector for selecting a set from the specified number of sets classified based on the photographing position data; and a display image output device for outputting a display image for displaying image data included in both the set selected by the photographing time selector and the set selected by the photographing position selector.

Further, according to still another aspect of the present invention, an image display apparatus comprises: a storage device for storing a plurality of image data each having first attribute data and second attribute data; a first classifier for classifying the plurality of image data into a specified number of sets based on their respective first attribute data; a second classifier for classifying the plurality of image data into a specified number of sets based on their respective second attribute data; and a display image output device for outputting a display image. The display image includes: a first attribute section which extends in a first direction, and is arranged with selective items corresponding to the specified number of sets classified based on the first attribute data; a second attribute section which extends in a second direction perpendicularly intersecting the first direction, and is arranged with selective items corresponding to the specified number of sets classified based on the second attribute data; to thereby display image data included in both the set corresponding to a selected item in the first attribute section and the set corresponding to a selected item in the second attribute section.

These and other objects, features and advantages of the present invention will become more apparent upon reading the following detailed description along with the accompanying drawings.

BRIEF DESCRIPTION OF THE DRAWINGS

FIG. 4 is a concept diagram showing a construction of a storage area of a place name storage;

DETAILED DESCRIPTION OF THE PREFERRED EMBODIMENTS OF THE INVENTION

Figure 1:
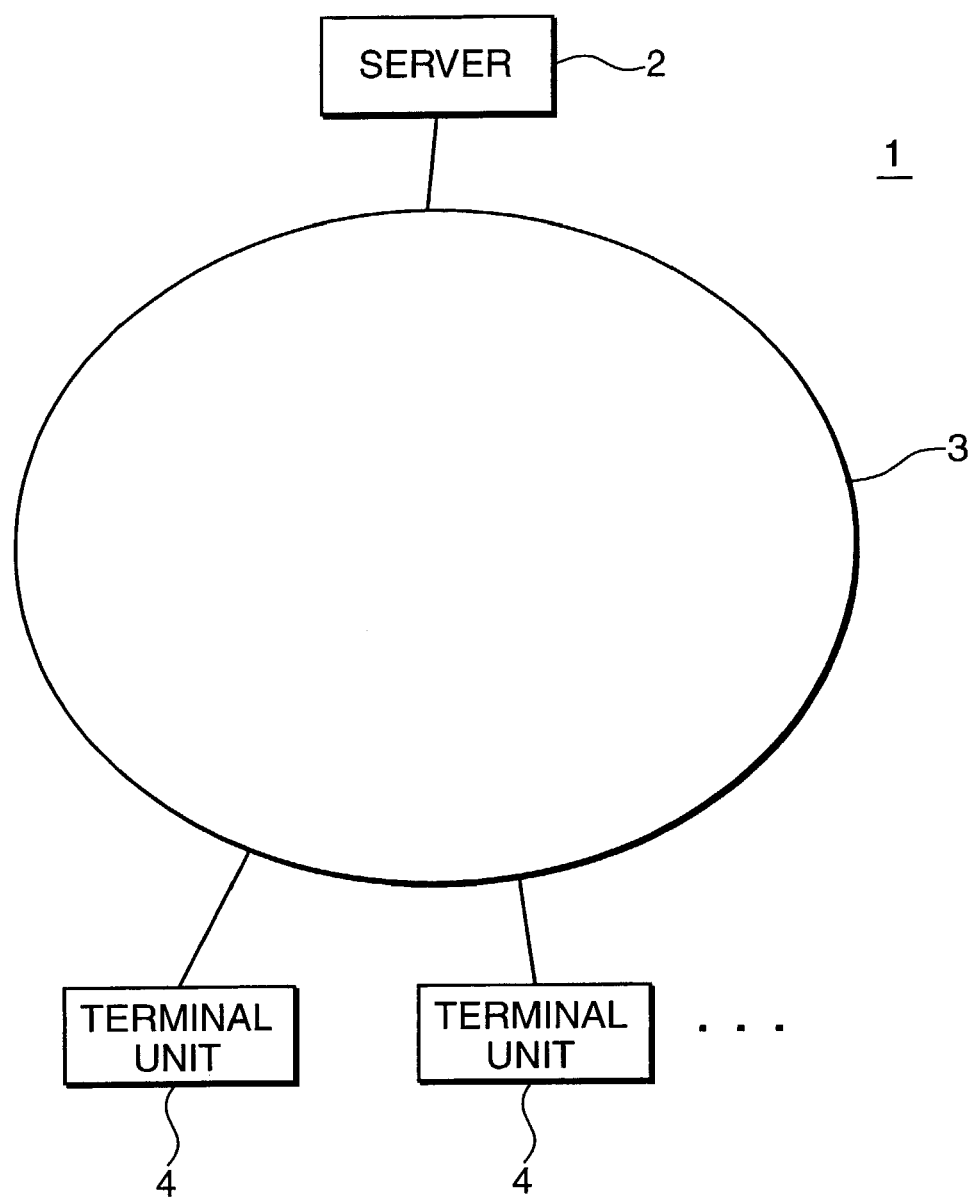
FIG. 1 is a diagram showing a schematic construction of a digital data searching system according to an embodiment of the present invention.

Referring to FIG. 1 showing a schematic construction of a digital data searching system according to an embodiment of the present invention, a digital data searching system 1 is provided with a server 2 constructing a digital data searching apparatus, and a plurality of terminal units or client terminal units 4 communicably connected with the server 2 via a network 3. Here, Internet is used as the network 3 and various pieces of information are transmitted and received between the server 2 and the terminal units 4 in accordance with a TCP/IP (Transmission Control Protocol/Internet Protocol). The network 3 is not limited to Internet, and may be other network such as Intranet or a combination of various networks such as Internet and Intranet. The server 2 and a plurality of terminal units 4 may be connected with each other via a special circuit.

In the case of using Internet as the network 3, the respective terminal units 4 are often connected with a specified provider server via a modem or the like and connected with the network 3 via the provider server. This provider server is neither shown nor described.

Figure 2:
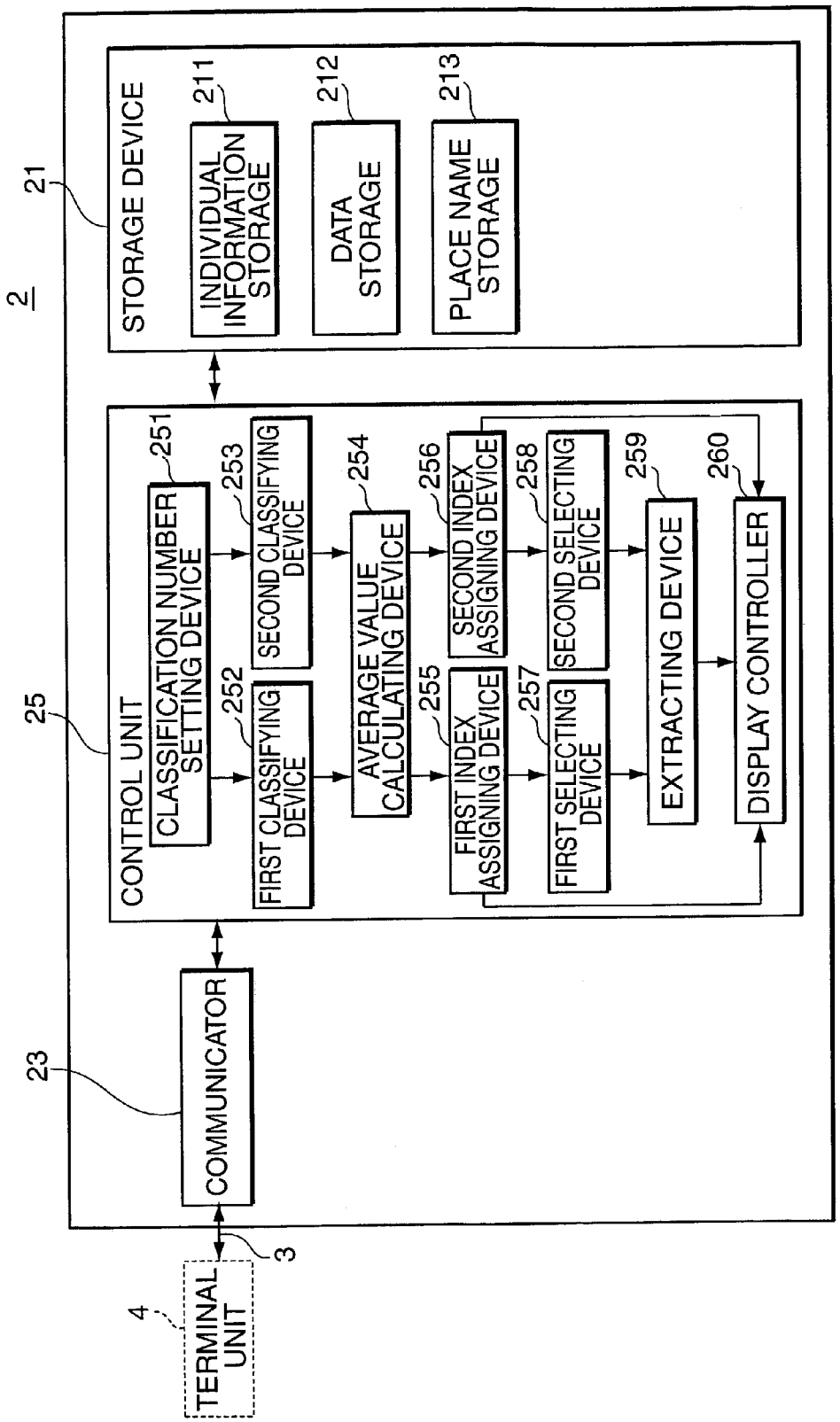
FIG. 2 is a block diagram showing a construction of a main part of a server of the digital data searching system.

FIG. 2 is a block diagram showing a construction of a main part of the server 2. In FIG. 2, the server 2 is provided with a storage device 21 for storing data transmitted from the terminal units 4; the data including image data obtained by photographing by means of, e.g., digital cameras and various attribute data belonging to the image data; a communicator 23 for transmitting and receiving various data to and from the terminal units 4 via the network 3; and a control unit 25 for searching image data stored in the storage device 21 using various attribute data stored in the storage device 21 based on a data transmitted from the terminal unit 4 via the communicator 23.

The storage device 21 includes an individual information storage 211 for storing pieces of individual information of users such as user IDs, a data storage 212 for storing image data, attribute data, etc., and a place name storage 213 for storing a place name data, etc.

The individual information storage 211 is adapted to store the user ID as a registration information of the user in correspondence with a password. The user ID is identification information of each user in the server 2. The password is for the individual authentication to prevent an illegitimate access from someone other than the registered user.

Figure 3:
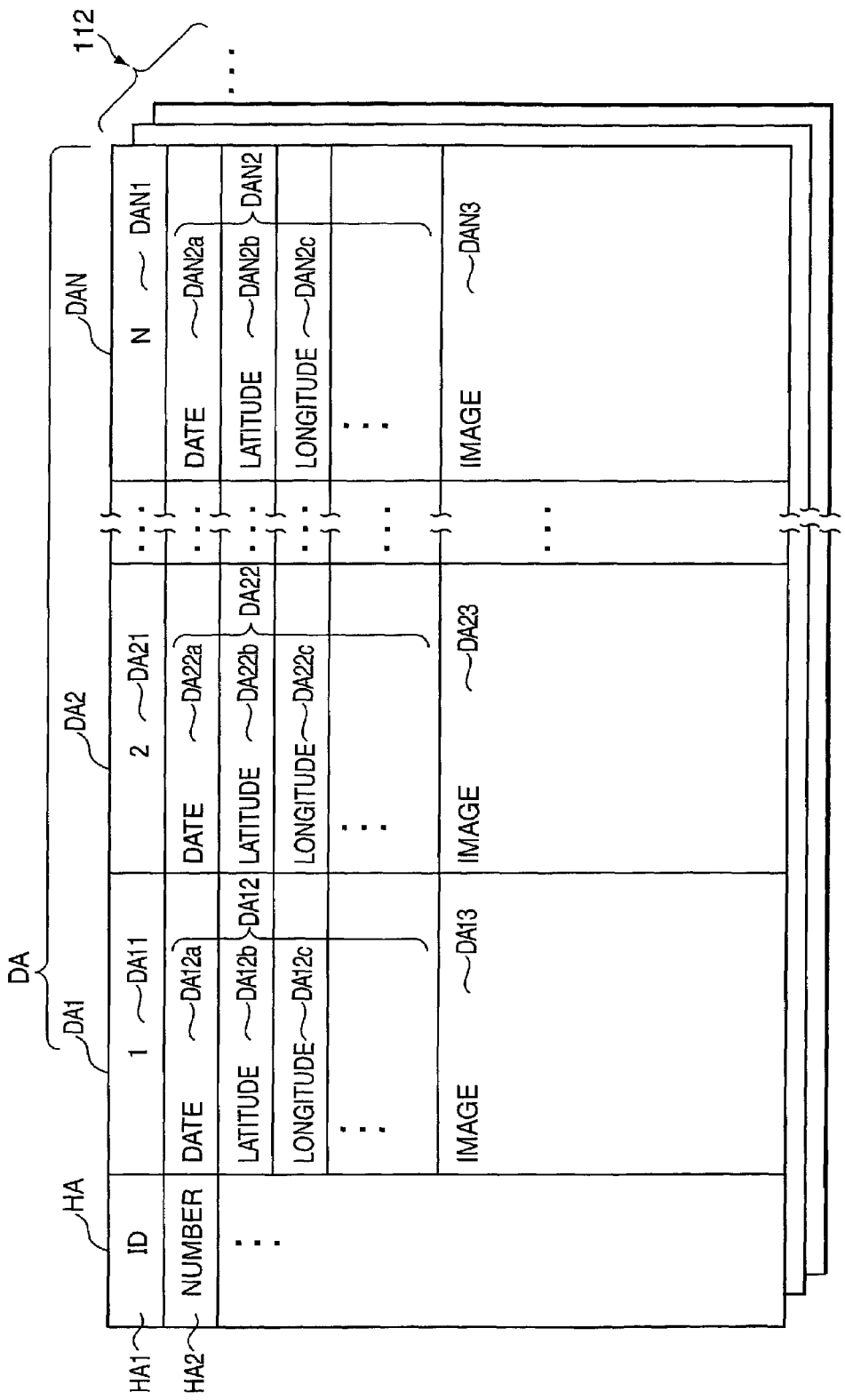
FIG. 3 is a concept diagram showing a construction of a data area of a data storage.

The data storage 212 is provided with a specified storage area for each user ID stored in the individual information storage 211 to store the image data and the like in correspondence with the user ID. As shown in FIG. 3, the storage area set in the data storage 212 for each user ID includes a header area HA for storing header information representing the characteristic of the storage area and a data area DA for storing image data and attribute data belonging to the image data.

In the header area HA are provided an ID area HA1 for storing the user ID and a data number area HA2 (here, the number of data is assumed to be N) for storing the number of the image data stored in the data storage DA. The data area DA is divided into N areas DA1, DA2, . . . DAN each adapted to store the image data as a unit. The respective divided areas have the same data configuration.

Specifically, the respective areas DA1, DA2, . . . DAN are provided with image name areas DA11, DA21, . . . DAN1 for storing the identification name of the image data; condition areas DA12, DA22, . . . DAN2 for storing photographing conditions as attribute data of the image data; and image areas DA13, DA23, . . . DAN3 for storing the image data. The respective condition areas DA12, DA22, . . . DAN2 are provided with date areas DA12$a$, DA22$a$, . . . DAN2$a$ for storing a date data representing a data of photographing by a digital camera or the like, latitude areas DA12$b$, DA22$b$, . . . DAN2$b$ for storing a latitude data representing a position of photographing (place of photographing) by a digital camera or the like, and longitude areas DA12$c$, DA22$c$, . . . DAN2$c$ for storing a longitude data representing a position of photographing (place of photographing) by a digital camera or the like.

Further, a storage area of the place name storage 213 is provided with a first area LA for storing a latitude data, a second area LN for storing a longitude data and a third area for storing a place name data as shown in FIG. 4. The latitude data, the longitude data and the name of place are stored in correspondence. For example, "Makuhari Messe" is stored in correspondence with lat. 33°29'46 N/long. 134°40'40 E; "Tokyo Big Site" in correspondence with lat. 33°29'05 N/long. 135°47'48 E; and "Shinjuku Station" in correspondence with lat. 33°59'05 N/long. 135°47'48 E.

The control unit 25 searches the image data stored in the storage device 21 using the date data and the position data which are attribute data stored in the storage device 21 as described above, and includes a CPU (central processing unit) for executing operations, a ROM (read-only memory) storing operation programs, data and the like, a RAM (random access memory) for temporarily storing data.

The control unit 25 classifies the image data into a specified number of sets by applying cluster analysis to the date data belonging to the respective image data; classifies the image data into a specified number of sets by applying cluster analysis to the latitude data and longitude data as the position data belonging to the respective image data; and calculates a product set of the set classified based on the date data and the set classified based on the position data to thereby search desired image data.

Cluster analysis is a known analysis method for statistically classifying objects by gathering similar objects from a mixed group of objects having different properties and forming them into a set or cluster. Thus, in order to apply cluster analysis to the attribute data belonging to the image data, the control unit 25 is provided with the respective function executing devices as a classification number setting device 251, a first classifying device 252, a second classifying device 253, an average value calculating device 254, a first index assigning device 255, a second index assigning device 256, a first selecting device 257, a second selecting device 258, an extracting device 259 and a display controller 260. These function executing devices function when the CPU executes the operation program or the like stored in the ROM or the like.

The classification number setting device 251 sets a set number i (i is an integer of 2 or larger) in the case of classifying the image data stored in the storage device 21 based on the date data, and sets a set number j (j is an integer of 2 or larger) in the case of classifying the image data stored in the storage device 21 based on the latitude data and the longitude data as the position data. These set numbers i, j are determined based on a cluster distance (uniting distance) of a tree diagram obtained by applying cluster analysis.

Accordingly, the classification number setting device 251 sets a value most approximate to the set number designated by a user as the set numbers i, j. For example, if the set number designated by the user is "5" and the set numbers actually obtained from the tree diagram are "2", "3", "4", "7", . . . , the classification number setting device 251 sets "4" as the set numbers i, j. Of course, "5" is set as the set numbers i, j if the set numbers actually obtained from the tree diagram include "5".

The first classifying device 252 classifies the image data into i sets set by the classification number setting device 251 by applying cluster analysis to the date data. The second classifying device 253 classifies the image data into j sets set by the classification number setting device 251 by applying cluster analysis to the latitude data and the longitude data as the position data. In this embodiment, cluster analysis is applied using "Euclidean distances" as distances between the date data and between the position data and "average distances" as distances between the sets.

The average value calculating device 254 calculates an average value of the date data of the image data belonging to the i sets obtained by the application of cluster analysis by the first classifying device 252 for each set, and calculates average values of the latitude data and the longitude data of the image data belonging to the j sets obtained by the application of cluster analysis by the second classifying device 253 for each set.

Specifically, if the date data of the image data belonging to one set (if, for example, five image data are present in this set, five date data are present) are, for example, 10:15 on Mar. 21, 2003; 12:20 on Mar. 22, 2003; 11:07 on Mar. 23, 2003; 13:45 on Mar. 24, 2003 and 19:23 on Mar. 25, 2003, an average value of these date data is 13:22 on Mar. 23, 2003.

Further, if the latitude data and the longitude data of the image data belonging to one set (if, for example, five image data are present in this set, five latitude data and five longitude data are present) are, for example, lat. 30°27'42 N/long. 131°38'36 E, lat. 32°33'50 N/long. 133°44'44 E, lat. 33°29'46 N/long. 134°40'40 E, lat. 34°25'42 N/long. 135°36'36 E and lat. 36°31'50 N/long. 137°42'44 E, the average values of these latitude data and longitude data are lat. 33°29'46 N/long. 134°40'40 E.

The first index assigning device 255 assigns indices (first indices) representing the characteristics of the respective sets to the i sets of the image data obtained by the application of cluster analysis by the first classifying device 252. In this embodiment, the average value of the date data of the image data belonging to each set calculated by the average value calculating device 254 is assigned as an index to each of the i sets.

The second index assigning device 256 assigns indices (second indices) representing the characteristics of the respective sets to the j sets of the image data obtained by the application of cluster analysis by the second classifying device 253. In this embodiment, the average value of the latitude data and longitude data of the image data belonging to each set calculated by the average value calculating device 254 and a specific name of place corresponding to the average values of the latitude data and the longitude data are assigned as indices to each of the j sets. This name of place is assigned after being read from the place name storage 213 of the storage device 21 based on the latitude data and the longitude data.

The first selecting device 257 selects one set corresponding to the designated first index from the i sets of the image data upon receiving an input (input designating one first index) from the terminal unit 4. The second selecting device 258 selects one set corresponding to the designated second index from the j sets of the image data upon receiving an input (input designating one second index) from the terminal unit 4.

The extracting device 259 obtains a product set of the set selected by the first selecting device 257 and the one selected by the second selecting device 258. This product set includes the image data having the date data corresponding to the designated first index and the position data corresponding to the designated second index out of the image data included in the set selected by the first selecting device 257 and the one selected by the second selecting device 258.

The display controller 260 displays a search screen including the first and second indices in a search screen display area of a monitor of a display device 47 provided in the terminal unit 4 and also displays images corresponding to the image data belonging to the set obtained by the extracting device 259 in a search result display area of the monitor of the display device 47 provided in the terminal unit 4. The display controller 260 displays various other screens in addition to the search screen and the search result.

Figure 5:
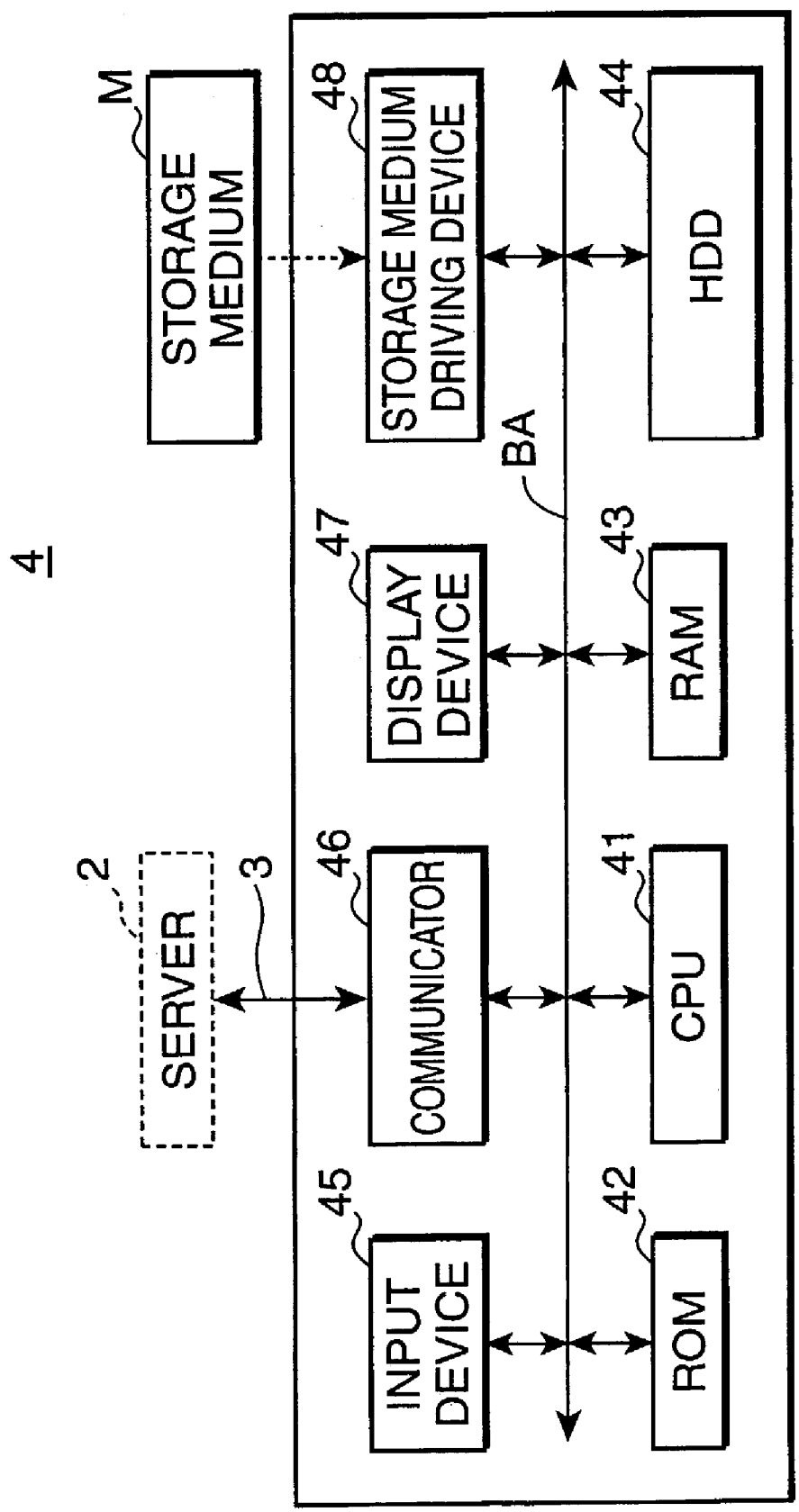
FIG. 5 is a block diagram showing a construction of a main part of a terminal unit of the digital data searching system.

FIG. 5 is a block diagram showing a construction of a main part of the terminal unit 4. The terminal unit 4 is constructed, for example, by a personal computer, and is provided with a CPU (central processing unit) 41 for executing the control of the entire terminal unit 4, a ROM (read-only memory) 42 for storing a basic program and the like for operating the terminal unit 4, a RAM (random access memory) 43 for temporarily storing various data, a HDD (hard disk drive) 44 storing various programs such as a brouser program used to read Web contents on the Web, an input device 45 for receiving an operation made by a user, a communicator 46 for transmitting and receiving various data to and from the server 2 via the network 3, the display device 47 for displaying various data, and a storage medium driving device 48 for reading data in a storage medium M loaded from outside.

The input device 45 is constructed, for example, by a keyboard, a mouse and the like, and various commands, etc. corresponding to operations made by the user are inputted mainly using a mouse in this embodiment. The display device 47 includes a CRT (cathode-ray tube), an LCD (liquid crystal display) or the like, and displays various screens for the search of image data under the control of the CPU 42. The recording medium driving device 48 is constructed, for example, by a memory card reader, and reads image data, attribute data and other data stored in the recording medium M under the control of the CPU 41.

The respective blocks of the terminal unit 4 are connected with an internal bus BA, and various data are inputted and outputted via the bus BA inside the terminal unit 4 and various operations are executed for the search of the image data in the server 2 under the control of the CPU 41. Specifically, the CPU 41 reads the basic program and the like from the ROM 42 and the brouser program and the like from the HDD 44, executes a specified operation in accordance with the input from the input device 45, transmits and receives data to and from the server 2 via the communicator 46, and controls the data to display various screens on the display device 47.

The storage medium M loaded in the recording medium driving device 48 is constructed, for example, by a memory card loadable in a digital camera equipped with an internal clock and a positioning means (GPS receiver, etc.) adopting GPS (global positioning system). An image data created by photographing an object, a date data (time data) representing a date on which the image data was created (date of photographing), a latitude data and a longitude data as a position data representing a position where the image data was created are stored in correspondence in this storage medium M.

FIGS. 6 to 10 are diagrams showing main screen images to be displayed on the display device 47 of the terminal unit 4 upon searching desired image data. These images are displayed on the display device 47 via the communication of the specified data between the server 2 and the terminal unit 4.

Figure 6:
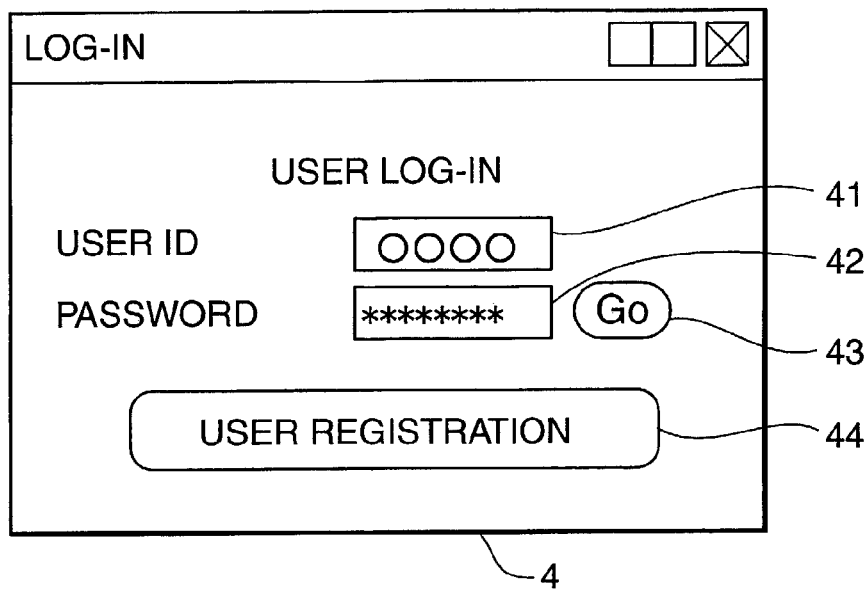
FIG. 6 is a diagram showing an initial screen to be displayed on a display device of the terminal unit.

Specifically, FIG. 6 shows an initial screen 4 to be displayed upon an access to a Web Photo site by inputting a specified URL by a Web brouser, and this initial screen 4 is comprised of an input setting section 41 for user ID, an input setting section 42 for password, a GO button 43 and a user registration button 44. The GO button 43 is used to instruct the transmission of the inputted user ID and password to the server 2 in the case that the user ID has been already acquired. The user registration button 44 is used to call a user registration screen in the case that the "Web Photo site" is accessed for the first time and no user ID has been acquired yet.

Figure 7:
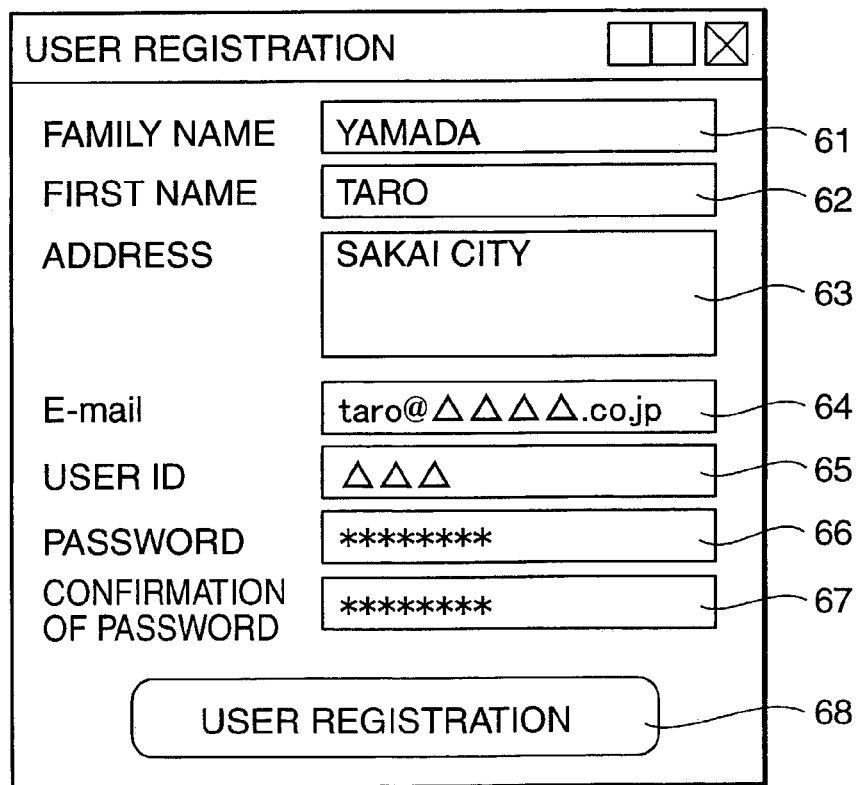
FIG. 7 is a diagram showing a user registration screen to be displayed on the display device of the terminal unit.

FIG. 7 shows a user registration screen 6 to be displayed when the Web Photo site is accessed for the first time. This user registration screen 6 is comprised of an input setting section 61 for family name, an input setting section 62 for first name, an input setting section 63 for address, an input setting section 64 for email address, an input setting section 65 for desired user ID, an input setting section 66 for desired password, an input setting section 67 for password confirmation, and a user registration button 68. The user registration button 68 is used to register data inputted in the respective input setting sections 61 to 67 in the server 2.

Figure 8:
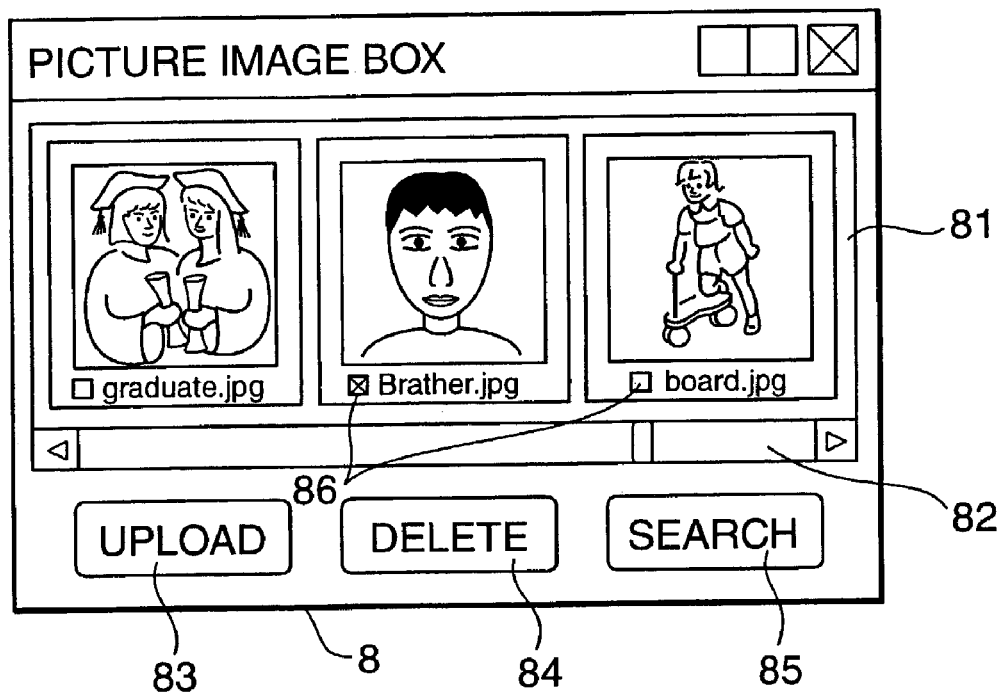
FIG. 8 is a diagram showing a picture image box to be displayed on the display device of the terminal unit.

FIG. 8 shows a picture image box 8 displaying a plurality of images read from the storage medium M by the storage medium driving device 48 of the terminal unit 4 or a plurality of images uploaded to the server 2 in thumbnail format. This picture image box 8 is comprised of an image display area 81 for transversely displaying a specified number (three in this embodiment) of images out of a plurality of images side by side, a scroll button 82 provided below the image display area 81, an upload button 83 provided at the left end below the scroll button 82, a delete button 84 provided in the middle below the scroll button 82, and a search button 85 provided at the right end below the scroll button 82.

File names are displayed below the respective images displayed in the image display area 81, and check boxes 86 are provided before the respective file names. The upload button 83 is used to upload the respective images scroll-displayed in the image display area 81 to the server 2. The delete button 84 is used to delete the image displayed in the image display area 81 and having the check box 86 marked with a cross. The search button 85 is used to display the search screen for the execution of the search of the images uploaded to the server 2.

Figure 9:
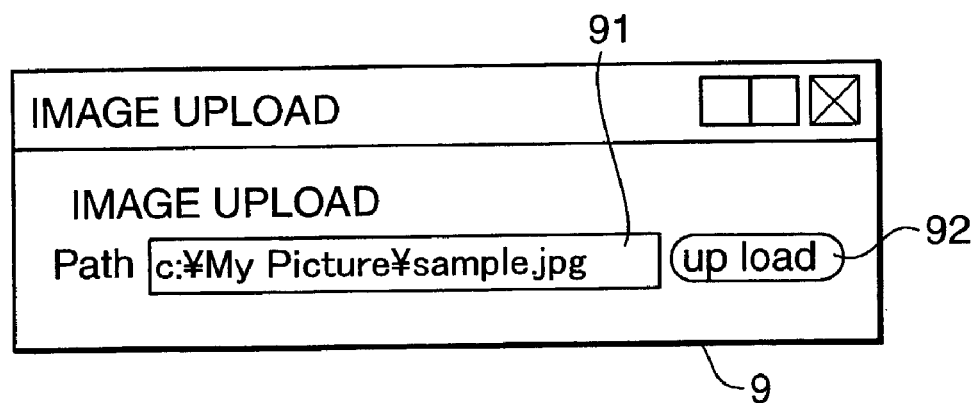
FIG. 9 is a diagram showing an upload screen to be displayed on the display device of the terminal unit.

FIG. 9 shows an upload screen 9 used to transfer the images displayed in the image display area 81 of the picture image box 8 shown in FIG. 8 to the Web Photo site. This upload screen 9 is comprised of an image file name input section 91 in which the file name of the image displayed in the image display area 81 is inputted and an upload button 92. The upload button 92 is operated after the file name is inputted in the image file name input section 91, thereby uploading the image displayed in the image display area 81 to the Web Photo site.

Figure 10:
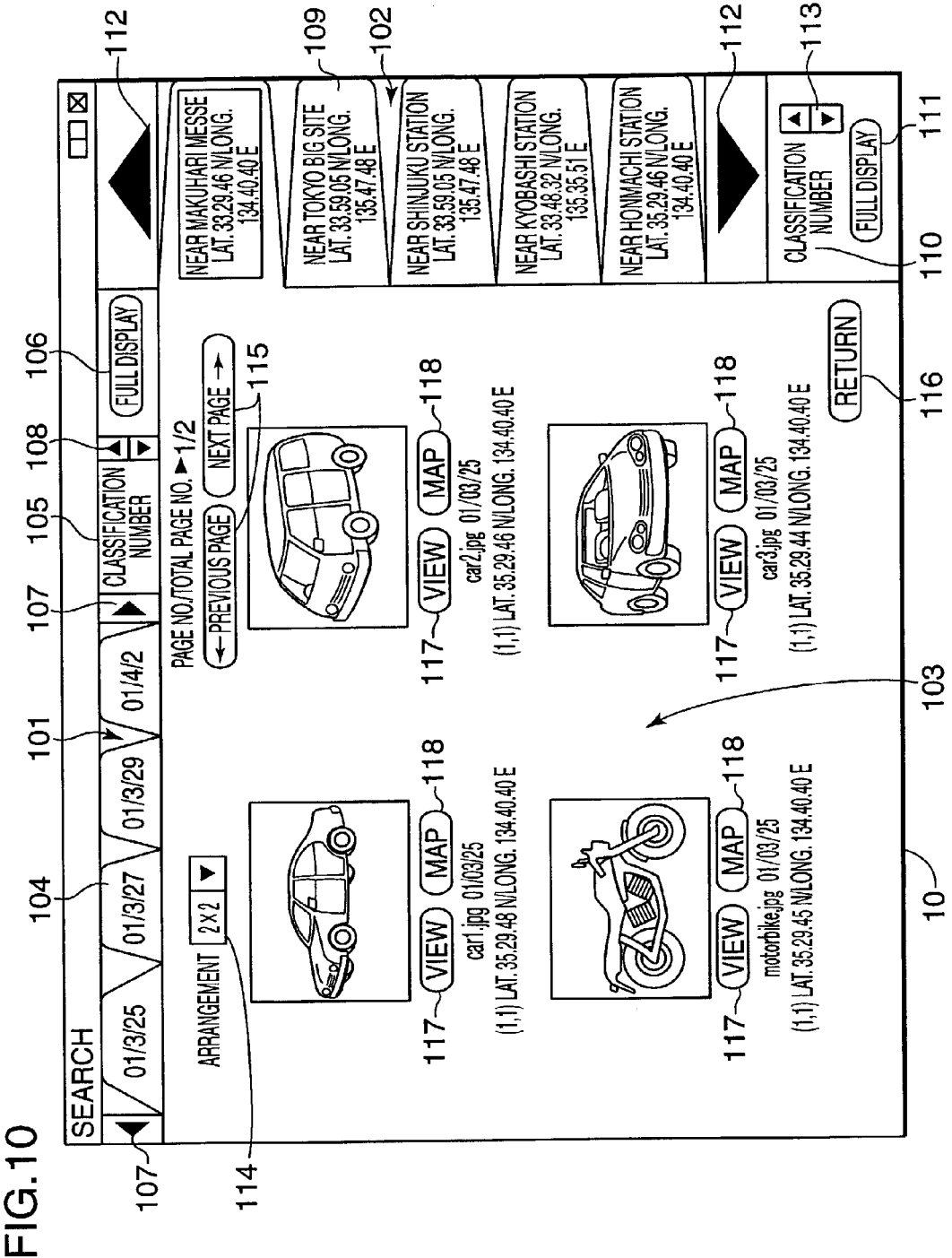
FIG. 10 is a diagram showing a search screen to be displayed on the display device of the terminal unit.

FIG. 10 shows a search screen 10 to be displayed upon operating the search button 85 of the picture image box 8 shown in FIG. 8. This search screen 10 is comprised of a first display area 101 transversely extending along the upper end, a second display area 102 vertically extending along the right end, and an image display area 103 defined in an area excluding the first and second display areas 101, 102.

The first display area 101 includes a first index display area 104 for transversely displaying a plurality of first indices based on the date data side by side, a classification number setting section 105 provided at the right side of the first index display area 104, a full display button 106 used to display the entire image based on the date data by canceling the search by the first indices, scroll buttons 107 provided at the left and right ends of the first index display area 101 and used to scroll-display the first indices, and a setting button 108 provided at the right end of the classification number setting section 105 and used to set the classification numbers. In the first index display area 104 are displayed dates (e.g., 25 Mar. 2001, 27 Mar. 2001) as indices assigned to the respective sets.

The second display area 102 includes a second index display area 109 in which a plurality of second indices based on the position data are displayed in a vertical arrangement, a classification number setting section 110 provided below the second index display area 109, a full display button 111 provided below the classification number setting section 110 for displaying an entire image based on the position data after canceling the search by the second indices, scroll buttons 112 provided at the upper and bottom ends of the second index display area 109 for scroll-displaying the second indices, and a setting button 113 provided at the bottom end of the classification number setting section 110 for setting a classification number. In the second index display area 109 are displayed the names of place, latitudes and longitudes as indices assigned to the respective sets (e.g., near Makuhari Messe, lat. 33.29.46 N/long. 134.40.40 E, near Tokyo Big Site, lat. 33.59.05 N/long. 135.47.48 E).

The image display area 103 includes an arrangement setting section 114 for setting the number of images to be arranged at the left side of the upper end, page switching sections 115 at the right side of the upper end, and a return button 116 used to return to the previous image at the right bottom end. Since 2×2 (a total of four images) is set as the number of images to be arranged in FIG. 10, four images are displayed in a 2×2 arrangement. A View button 117 and a Map button 118 are provided below each image, and the date data and the position data are displayed below the View button 117 and the Map button 118.

The View button 117 is used to enlargedly display the image. Upon the operation of the View button 117, other images are erased and an image having a size corresponding to the operation of the View button 117 is enlargedly displayed. If the return button 116 is operated in this state, the display returns to the initial one with four images. The Map button 118 is used to display the position data of the image on a map. Upon the operation of the Map button 118, a map image is displayed after all the images are erased. If the return button 116 is operated in this state, the display returns to the initial one with four images. When the return button 116 is operated with the image shown in FIG. 10 displayed, the display returns to the image of the picture image box 8 shown in FIG. 8.

Next, the operation of the digital data searching system 1 constructed as above is described with reference to a flowchart shown in FIG. 11. First, the server 2 discriminates whether or not a user ID is already registered (Step #1). Specifically, when a user operates the terminal unit 4 and accesses to the Web Photo site by inputting a specified URL by means of the Web brouser, the initial screen 4 shown in FIG. 6 is displayed. When the user ID and the password are inputted in the input setting sections 41, 42 and the GO button 43 is operated, the inputted user ID and password are transferred to the server 2. At this time, the control unit 25 of the server 2 discriminates whether or not the inputted user ID is already registered by comparing it with the user IDs registered in the storage device 21.

If the discrimination result in Step #1 is negative, user registration is carried out (Step #3). Specifically, the user registration screen 6 shown in FIG. 7 is transferred from the server 2 to the terminal unit 4 and displayed on the displayed device 47. Then, when the user input necessary data in the respective input setting sections 61 to 67 and operates the user registration button 68, the respective inputted data are transferred to the server 2. The control unit 25 of the server 2 stores the respective transferred data in the storage device 21, completing the registration.

If the same user ID as the one inputted is already acquired by another person, the user registration screen 6 in which only the input setting section 65 for user ID is blank is displayed on the display device 47 after a corresponding warning is made. In such a case, the user sets another user ID.

If the discrimination result in Step #1 is affirmative or if the user registration is carried out in Step #3, the picture image box 8 shown in FIG. 8 transmitted from the server 2 is displayed on the display device 47 of the terminal unit 4 (Step #5). If the image data are already registered in the server 2, the registered image are displayed in thumbnail format in the image display area 81 of the picture image box 8. On the other hand, if no image data has been registered yet, the image display area 81 is blank.

Subsequently, a function discriminating device of the CPU 41 of the terminal unit 4 discriminates whether or not the image data is to be uploaded (Step #7). Specifically, if an image is desired to be registered in the server 2, a new image photographed by means of a digital camera or the like is displayed in the image display area 81 of the picture image box 8 after being read from the storage medium M or the like and stored in the HDD 44 or the like. Thereafter, the upload button 83 is operated. Accordingly, the discrimination in Step #7 is made based on a signal outputted upon the operation of the upload button 83.

If the discrimination result in Step #7 is affirmative, the image read from the storage medium M or the like is uploaded to the server 2 (Step #9). The image is uploaded to the server 2 by operating the upload button 92 after the upload screen 9 shown in FIG. 9 is displayed and a necessary data is inputted in the image file name input section 91.

If the discrimination result in Step #7 is negative or if uploading is completed in Step #9, the function discriminating device of the CPU 41 of the terminal unit 4 discriminates whether or not the images displayed in the image display area 81 of the picture image box 8 are to be partly deleted (Step #11). Specifically, if the images registered in the server 2 are desired to be partly deleted, the delete button 84 is operated after the check box 86 of the image displayed in the image display area 81 is marked with a cross. Thus, the discrimination in Step #11 is made based on a signal outputted upon operating the delete button 84.

If the discrimination result in Step #11 is affirmative, the registration of the image having the check box 86 marked with a cross in the server 2 is erased (Step #13). If the discrimination result in Step #11 is negative or if the deletion of the image is completed in Step #13, image search in the server 2 is subsequently executed (Step #15).

Figure 11:
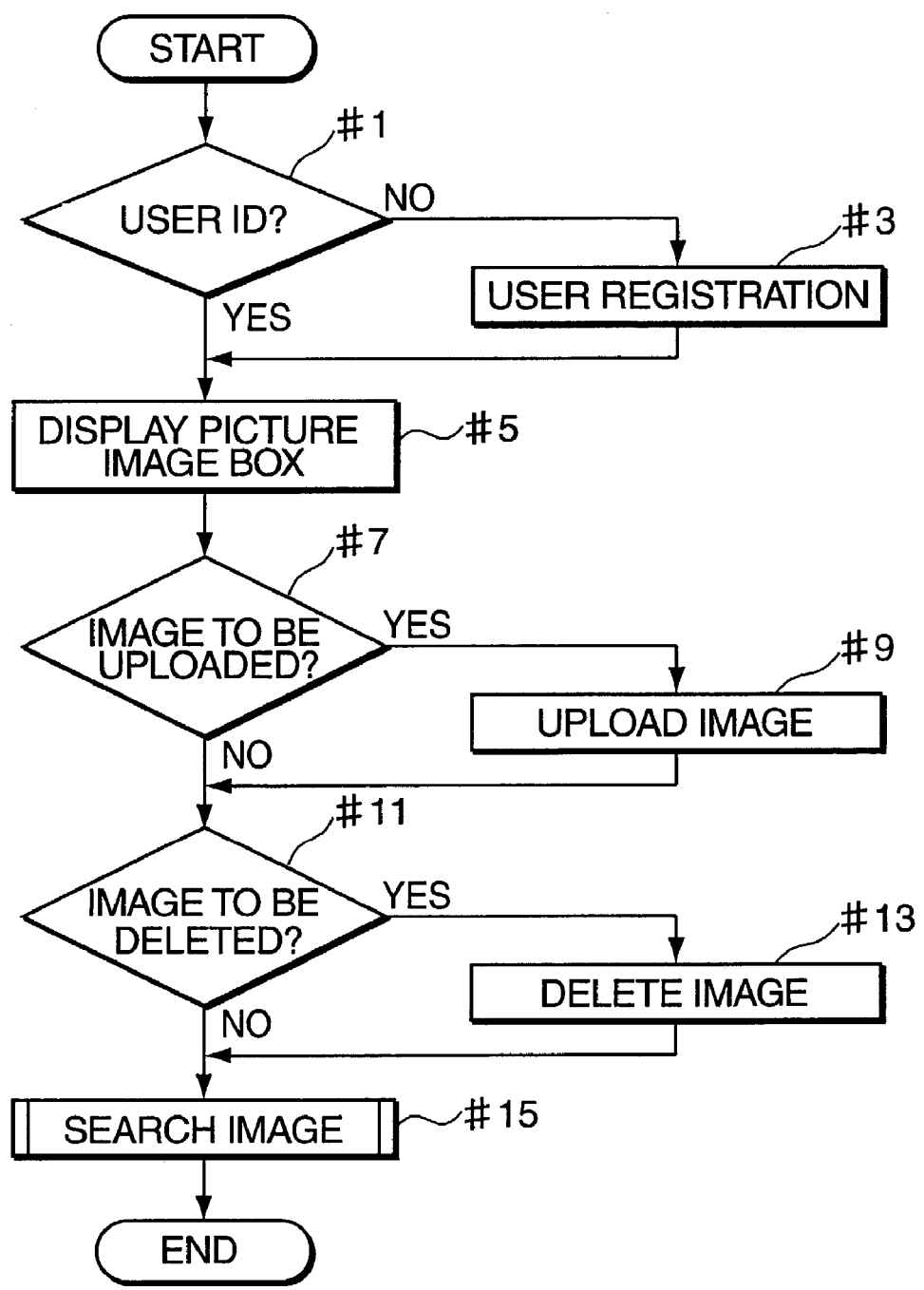
FIG. 11 is a flowchart showing an operation of the digital data searching system.

Next, the searching operation in Step #15 of the flowchart shown in FIG. 11 is described with reference to a flowchart shown in FIG. 12. First, cluster analysis is applied to the image data registered in the server 2 and a preprocessing (initial processing) which is a processing executed until the searched images are displayed on the display device 47 of the terminal unit 4 is executed (Step #101).

Subsequently, the function discriminating device of the CPU 41 of the terminal unit 4 discriminates whether or not to change the classification number i in the case of classifying the image data into a specified number of sets by applying cluster analysis to the date data attached to the image data (Step #103). Specifically, in the case of changing the classification number i for the date data, a confirmation key or the like of the input device 45 of the terminal unit 4 is operated to designate a change of the classification number i after the setting in the classification number setting section 105 for the date data of the images to be searched shown in FIG. 10 is changed. Thus, the discrimination in Step #103 is made based on a signal outputted when a change is designated by means of the input device 45.

If the discrimination result in Step #103 is affirmative, the classification number i for the date data is changed by the first selecting device 257 of the control unit 25 (Step #105). If the discrimination result in Step #103 is negative or if the operation of changing the classification number i is completed in Step #105, the function discriminating device of the CPU 41 of the terminal unit 4 discriminates whether or not to change the classification number j in the case of classifying the image data into a specified number of sets by applying cluster analysis to the position data attached to the image data (Step #107). Specifically, in the case of changing the classification number j for the position data, the confirmation key or the like of the input device 45 of the terminal unit 4 is operated to designate a change of the classification number j after the setting in the classification number setting section 110 for the position data of the images to be searched shown in FIG. 10 is changed. Thus, the discrimination in Step #107 is made based on a signal outputted when a change is designated by means of the input device 45.

If the discrimination result in Step #107 is affirmative, the second selecting device 258 of the control unit 25 changes the classification number j for the position data (Step #109). If the discrimination result in Step #107 is negative or if the operation of changing the classification number j is completed in Step #109, one set TS is selected from the i sets based on the date data (Step #111). This selection is made by selecting a specified index (e.g., Mar. 27, 2001) displayed in the first index display area 104 of the search screen 10 shown in FIG. 10 by click-operation of a mouse device or operation of a cursor key, and operating the confirmation key or the like of the input device 45 of the terminal unit 4.

Subsequently, one set PS is selected from the j sets based on the position data (Step #113). This selection is made by selecting a specified index (e.g., near Makuhari Messe, lat. 33.29.46 N/long. 134.40.40 E) displayed in the second index display area 109 on the search screen 10 shown in FIG. 10 by click-operation of a mouse device or operation of a cursor key, and operating the confirmation key or the like of the input device 45 of the terminal unit 4.

Subsequently, a product set PRS of one set TS selected from the i sets based on the date data and one set PS selected from the j sets based on the position data is calculated (Step #115). This product set PRS is calculated when one set PS is selected from the j sets based on the position data in Step #113, or the confirmation key or the like of the input device 45 of the terminal unit 4 is operated.

Subsequently, images based on the image data included in the product set PRS calculated in Step #115 are displayed on the display device 47 of the terminal unit 4 (Step #117). The control unit 25 then discriminates whether or not the searching operation has been completed (Step #119). This discrimination is made in accordance with the presence or absence of a signal outputted upon operating the confirmation key or the like of the input device 45 of the terminal unit 4. This subroutine returns to the main flow shown in FIG. 11 if the discrimination result in Step #119 is affirmative, whereas Step #103 follows to repeat the operations of Step #103 and following Steps if the discrimination result in Step #119 is negative.

Figure 12:
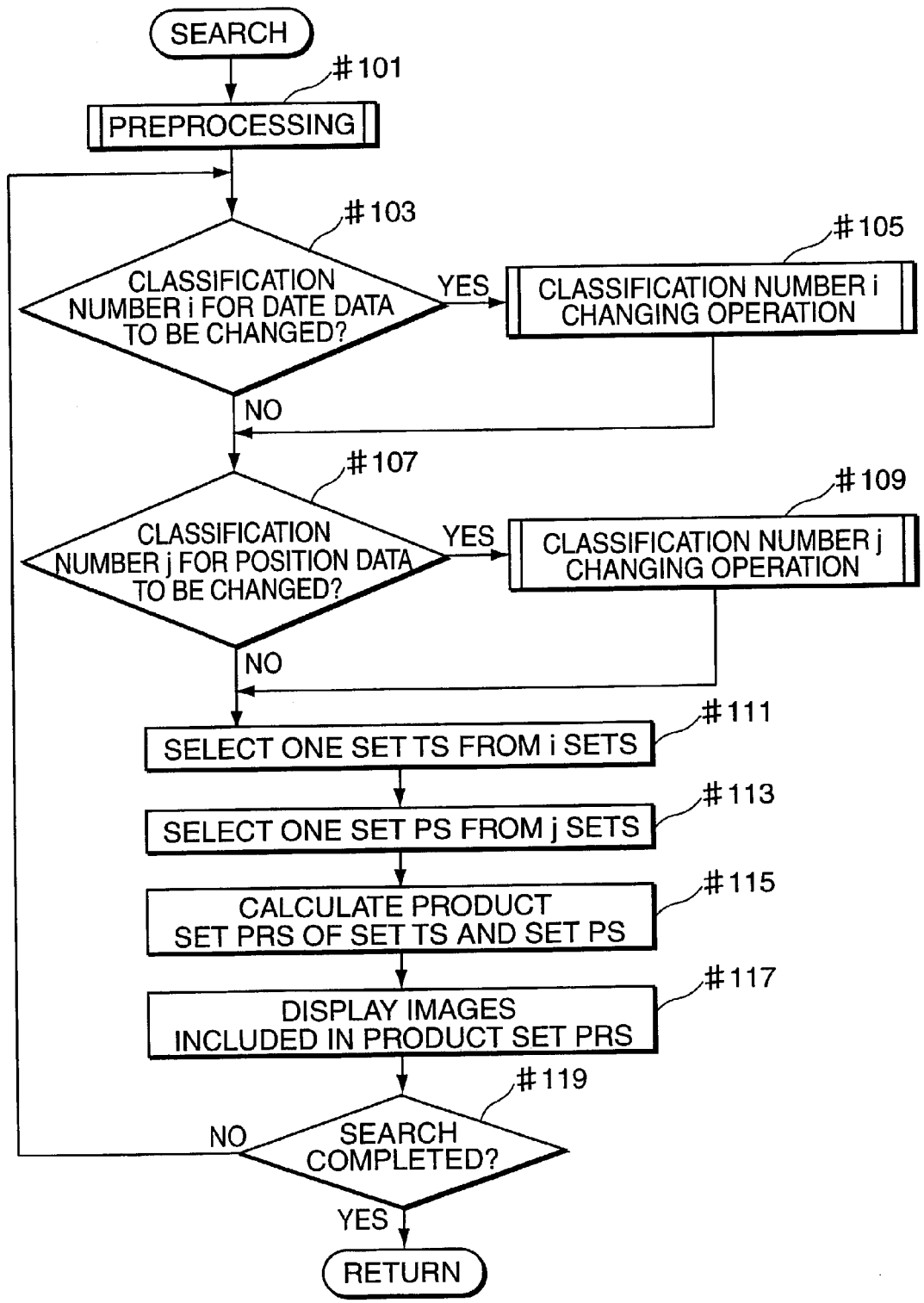
FIG. 12 is a flowchart showing a searching operation of the digital data searching system.
Figure 13:
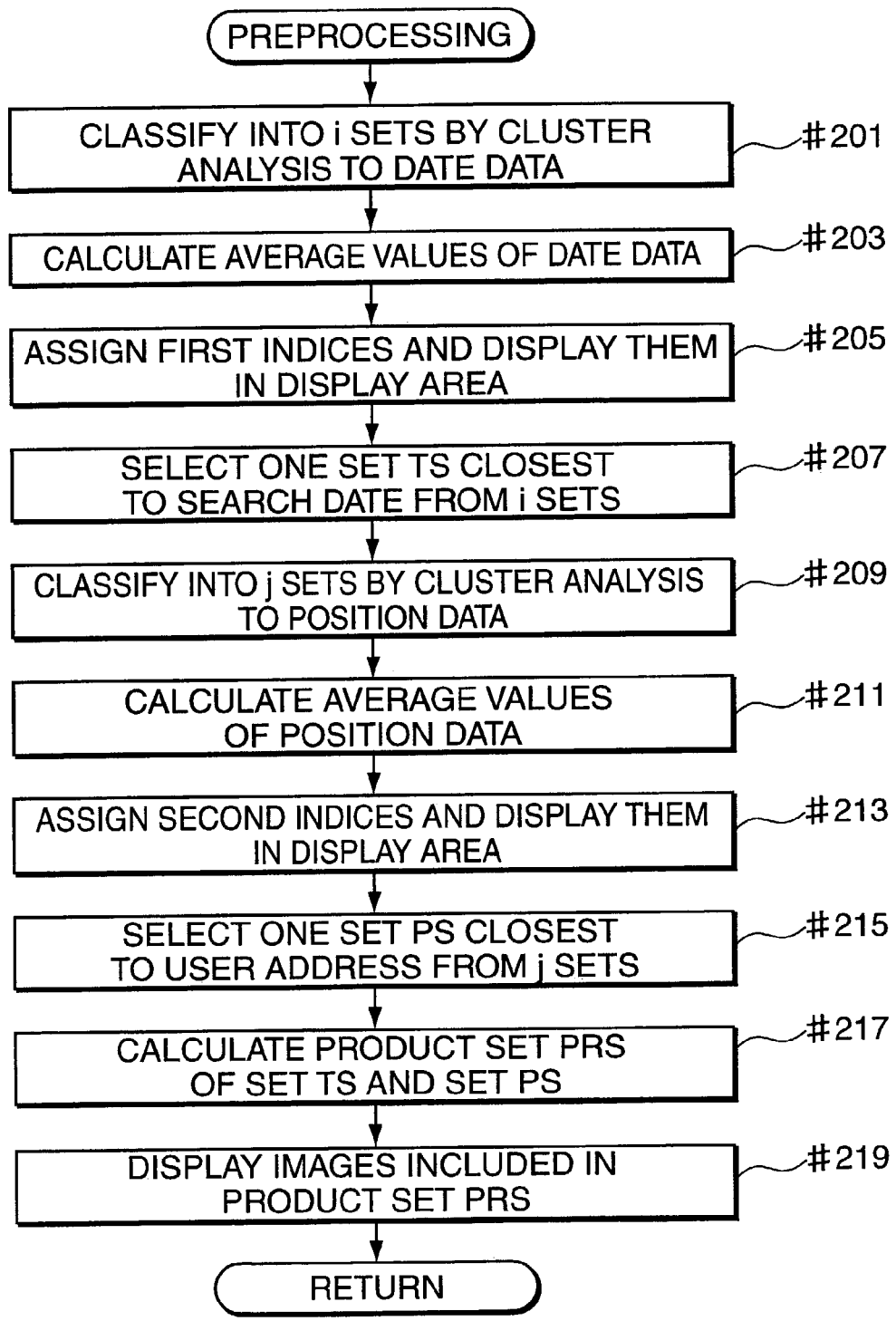
FIG. 13 is a flowchart showing a preprocessing of the digital data searching system.

Next, the preprocessing executed in Step #101 of the flowchart shown in FIG. 12 is described with reference to a flowchart of FIG. 13. First, cluster analysis is applied to the date data to classify the image data into i sets (Step #201). Specifically, cluster analysis in Step #201 is such that the preset classification number i is automatically set by the classification number setting device 251, and the date data having similar dates are grouped out of those assigned in correspondence with the respective image data to classify the image data into the i sets in accordance with the tree diagram.

Subsequently, the average value calculating device 254 calculates an average value of the date data for each of the i sets classified in Step #201 (Step #203). Then, the first index assigning device 255 assigns the first index to each of the i sets and each first index is displayed in the first index display area 104 in the order of dates (Step #205). In this embodiment, the average values of the date data are assigned as the first indices as described above.

Subsequently, one set TS having the average date closest to the search date is automatically selected from the i sets (Step #207). The first index corresponding to the selected set TS is stored in the storage device 21 and displayed on the search screen 10 displayed on the display device 47 in an inverted manner. It should be noted that one set TS having the average date closest to the search date is selected for the sake of convenience and the set to be selected is not limited thereto.

Subsequently, cluster analysis is applied to the position data to classify the image data into j sets (Step #209). Specifically, cluster analysis in Step #209 is such that the preset classification number j is automatically set by the classification number setting device 251, and the position data having similar positions are grouped out of those assigned in correspondence with the respective image data to classify the image data into the j sets in accordance with the tree diagram.

Subsequently, the average value calculating device 254 calculates an average value of the position data for each of the j sets classified in Step #209 (Step #211). Then, the second index assigning device 256 assigns the second index to each of the j sets and each second index is displayed in the second index display area 109 in the order of positions (Step #213). In this embodiment, the average value of the position data and the name of place corresponding to this average position data are assigned as the second indices as described above.

Subsequently, one set PS having the average position closest to the user's address is automatically selected from the j sets (Step #215). The second index corresponding to the selected set PS is stored in the storage device 21 and displayed on the search screen 10 displayed on the display device 47 in an inverted manner. It should be noted that one set TS having the average position closest to user's address is selected for the sake of convenience and the set to be selected is not limited thereto.

Subsequently, the product set PRS of one set TS selected from the i sets based on the date data and one set PS selected from the j sets based on the position data is automatically calculated (Step #217). Then, images based on the image data included in the product set PRS selected in Step #217 are displayed on the display device 47 of the terminal unit 4 (Step #219).

Figure 14:
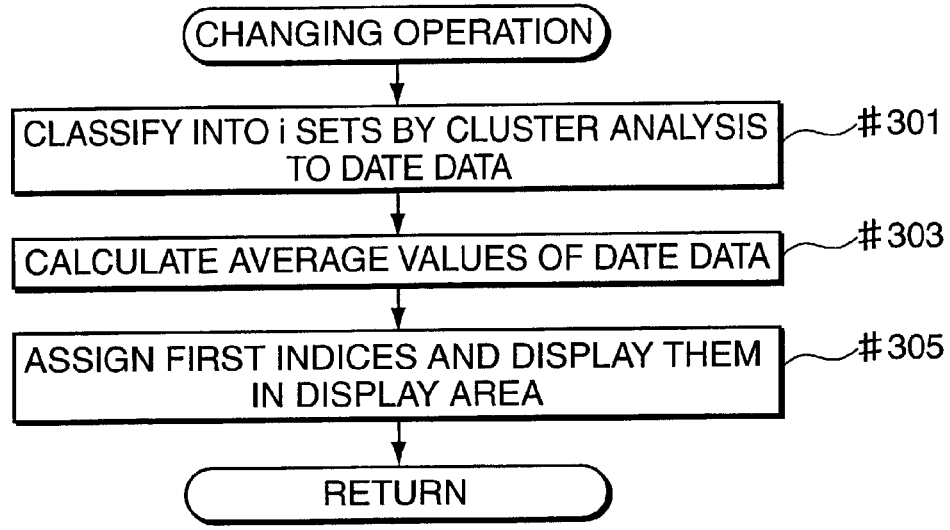
FIG. 14 is a flowchart showing an operation of changing a classification number in the digital data searching system.

Next, the operation of changing the classification number i in Step #105 of the flowchart shown in FIG. 12 is described with reference to a flowchart shown in FIG. 14. First, the first classifying device 252 classifies the image data into the changed i sets based on the date data in accordance with the tree diagram based on the results of cluster analysis applied in Step #201 (Step #301).

Subsequently, the average value calculating device 254 calculates the average value of the date data for each of the i sets classified in Step #301 (Step #303). Then, the first index assigning device 255 assigns the first index to each of the i sets and each first index is renewably displayed in the first index display area 104 in the order of dates (Step #305).

Figure 15:
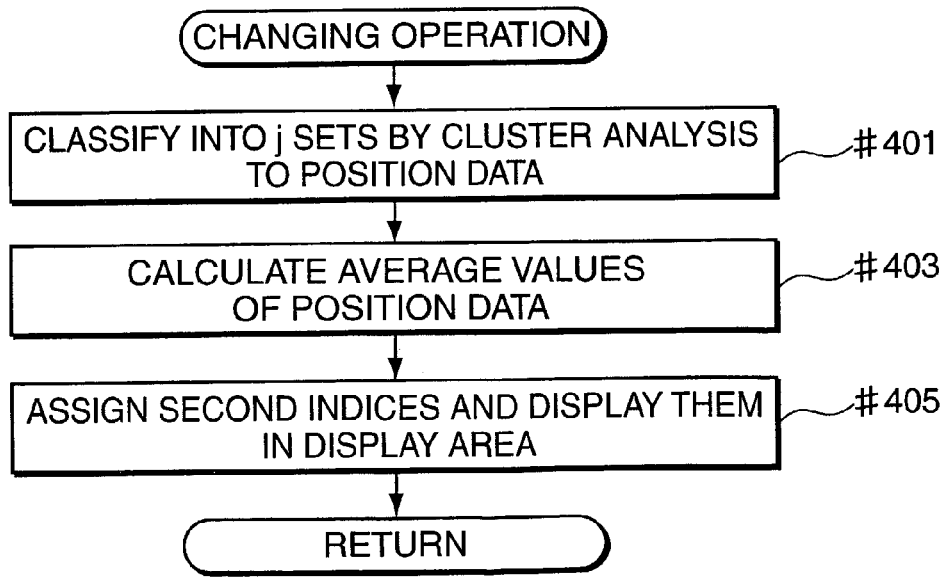
FIG. 15 is a flowchart showing an operation of changing another classification number in the digital data searching system.

Next, the operation of changing the classification number j in Step #109 of the flowchart shown in FIG. 12 is described with reference to a flowchart shown in FIG. 15. First, the second classifying device 253 classifies the image data into the changed j sets based on the position data in accordance with the tree diagram based on the results of cluster analysis applied in Step #209 (Step #401).

Subsequently, the average value calculating device 254 calculates the average value of the position data for each of the j sets classified in Step #401 (Step #403). Then, the second index assigning device 256 assigns the second index to each of the j sets and each second index is renewably displayed in the second index display area 109 in the order of positions (Step #405).

Since the digital data searching system of the present invention is constructed as in the foregoing embodiment, extended search can be easily made by initially setting the classification numbers i,j at small values and gradually increasing the classification numbers i, j while confirming images being displayed even if the user has no clear memory about the date data and the position data assigned to the image data. Further, since the average values of the date data, and the position data of each set are assigned as indices, search can be easily made even if the user has no clear memory about the date data and the position data.

The present invention is not limited to the foregoing embodiment and may take various embodiments as described below if necessary.

(1) Although the digital data searching system is comprised of the server 2 as a digital data searching apparatus and the terminal units 2 communicably connected with the server 2 via the network 3 in the foregoing embodiment, the present invention is not limited thereto. For instance, one personal computer or one digital camera can be provided with main functions of the server 2 and/or main functions of the terminal unit 4. Specifically, the digital data searching system may be constructed only by one personal computer or only by one camera without using the network 3. In such a case, the personal computer or the camera constructs the digital data searching apparatus.

(2) Although the date data includes a time data (e.g., 15:25 on Mar. 25, 2002) in the foregoing embodiment, the present invention is not limited thereto. For example, the date data may include no time data (e.g., Mar. 25, 2002).

(3) Although the latitude data and the longitude data are used as the position data in the foregoing embodiment, the present invention is not limited thereto. For example, data directly expressing the names of places may be used. The place name data may be obtained by the automatic conversion from a table stored in a memory, for example, when the latitude data and the longitude data are obtained by means of a GPS receiver or the like.

(4) Although the position data are obtained using the GPS in the foregoing embodiment, the present invention is not limited thereto. For example, it is also possible to use ID information (base information) transmitted from base stations of the PHP (personal handy phone system) which is one communication system in the public mobile communication servers in Japan and ID information (base information) transmitted from base stations of the mobile phone communication system, car phone communication system or the like as another communication system.

(5) Although the classification number setting device 251 of the control unit 25 of the server 2 sets the classification numbers i, j at an integer of 2 or larger, and does not function when full display is designated in the foregoing embodiment, the present invention is not limited thereto. For example, the classification numbers i, j may be set at 1 or larger integer and the classification number setting device 251 sets the respective classification numbers i, j at 1 when full display is designated.

(6) Although the digital data handled by the digital data searching system 1 are image data including moving image data as well as still image data, i.e., the digital data searching system being an image data searching system, in the foregoing embodiment, the present invention is not limited thereto. For example, the present invention is also applicable to cases where digital data are sound data or various measurement data such as vibration wave data. For instance, if the digital data are sound data, a searched sound may be outputted from a sound output means such as a loudspeaker instead of displaying the searched image. Further, if the digital data are vibration wave data, a searched wave or the like may be displayed.

(7) Although the digital data searching system 1 obtains the specified sets by applying cluster analysis to the attribute data belonging to the image data in the foregoing embodiment, the present invention is not limited thereto. In short, sets of similar data may be obtained by various analysis methods. Further, in the case of adopting cluster analysis, "Euclidean distances" are used as distances between the date data and between the position data and "average distances" are used as distances between the sets. However, the present invention is not limited thereto. For example, "weighted Euclidean distances," "standard Euclidean distances," "Manhattan distances," and the like may be used as distances between the date data and between the position data. Further, "shortest distances," "largest distances," "centroid distances" and the like may be used as distances between the sets.

(8) Although the first indices and the second indices are displayed in directions intersecting with each other on the search screen shown in FIG. 10 in the foregoing embodiment, the present invention is not limited thereto. For example, the first indices and the second indices may be displayed parallel with each other.

(9) Although the first indices concern the date data and the second indices concern the position data in the foregoing embodiment, the present invention is not limited thereto. For example, in the case of photographed images, various pieces of photographing information such as F-numbers of lenses, object distances and image sizes may be used as indices. Further, although the average values of the respective sets are assigned as indices in the foregoing embodiment, the present invention is not limited thereto. For example, suitable names characterizing the respective sets may be used as indices.

(10) Although the classification number setting device 251 can changeably set the classification numbers i, j for both first and second indices in the foregoing embodiment, the present invention is not limited thereto. For example, the classification number setting device 251 may changeably set either one of the indices.

As described above, an inventive digital data searching apparatus is provided with: a data storage device which stores a plurality of digital data, and first attribute data and second attribute data representing conditions on which the plurality of digital data are respectively created in correspondence; a first classifier which classifies the plurality of digital data into i sets (i is an integer of 2 or larger) based on their respective first attribute data; a second classifier which classifies the plurality of digital data into j sets (j is an integer of 2 or larger) based on their respective second attribute data; a first selector which selects a set from the i sets; a second selector which selects a set from the j sets; an extractor which calculates a product set of the set selected by the first selector and the set selected by the second selector; and a display controller which is communicatable with a display device for displaying an image, and controls the display device to display digital data included in the product set.

Also, an inventive display apparatus is provided with a storage device which stores a plurality of image data each having photographing time data and photographing position data; a photographing time classifier which classifies the plurality of image data into a specified number of sets based on their respective photographing time data; a photographing position classifier which classifies the plurality of image data into a specified number of sets based on their respective photographing position data; a photographing time selector which selects a set from the specified number of sets classified based on the photographing time data; a photographing position selector which selects a set from the specified number of sets classified based on the photographing position data; and a display image output device which outputs a display image for displaying image data included in both the set selected by the photographing time selector and the set selected by the photographing position selector.

Further, an inventive image display apparatus is provided with: a storage device which stores a plurality of image data each having first attribute data and second attribute data; a first classifier which classifies the plurality of image data into a specified number of sets based on their respective first attribute data; a second classifier which classifies the plurality of image data into a specified number of sets based on their respective second attribute data; and a display image output device which outputs a display image including a first attribute section which extends in a first direction, and is arranged with selective items corresponding to the specified number of sets classified based on the first attribute data, a second attribute section which extends in a second direction perpendicularly intersecting the first direction, and is arranged with selective items corresponding to the specified number of sets classified based on the second attribute data, to thereby display image data included in both the set corresponding to a selected item in the first attribute section and the set corresponding to a selected item in the second attribute section.

The digital data searching apparatus may be further provided with a first index assigner which assigns first indices representing the respective characteristics of the i sets; and a second index assigner which assigns second indices representing the respective characteristics of the j sets. In this case, the first and second selector select sets upon designation of a first index and a second index.

The display controller may be preferably made to control the display device to display the first indices and the second indices in directions intersecting with each other on the display device.

The digital data searching apparatus may be further provided with an average value calculator which calculates an average value of the first attribute data corresponding to the digital data belonging to each of the i sets and calculates an average value of the second attribute data corresponding to the digital data belonging to each of the j sets. In this case, the first index assigner assigns the first indices based on the average values of the first attribute data and the second index assigner assigns the second indices based on the average values of the second attribute data.

In the case where the digital data is image data, the first attribute data may be made to be time data representing a date on which the digital data was created. The second attribute data may be made to be position data representing a place where the digital data was created.

The position data may include latitude data and longitude data. The apparatus may be further provided with a place name storage device which stores place name data corresponding to the latitude data and the longitude data in correspondence with the latitude data and the longitude data, and the second index assigner reads the corresponding place name data from the place name storage device based on the average value of the latitude data and the average value of the longitude data and assigns it as the second index.

The first and second classifier may apply cluster analysis to the first attribute data and to the second attribute data, respectively, and classify the plurality of digital data into the i sets and into the j sets in accordance with a tree diagram created as a result of the cluster analysis.

The digital data searching apparatus may be further provided with a classification number setter which sets at least either one of the classification numbers i and j.

The display image may include a photographing time section which extends in a first direction, and is arranged with selective items corresponding to the specified number of sets classified based on the photographing time data; a photographing position section which extends in a second direction perpendicularly intersecting the first direction, and is arranged with selective items corresponding to the specified number of sets classified based on the photographing position data to thereby display image data included in both the set corresponding to a selected item in the photographing time section and the set corresponding to a selected item in the photographing position section.

The image display apparatus may be further provided with a time index assigner which assigns position indices representing the respective photographing time of the sets classified based on the photographing time data; and a position index assigner which assigns position indices representing the respective photographing position of the sets classified based on the photographing position data. The photographing time selector and the photographing position selector select sets upon designation of a photographing time index and a photographing position index.

The image display apparatus may be further provided with an average value calculator which calculates an average value of the photographing time data corresponding to the image data belonging to each of the sets classified based on the photographing time data and calculates an average value of the photographing position data corresponding to the image data belonging to each of the sets classified based on the photographing position data. The time index assigner assigns the time indices based on the average values of the photographing time data; and the position index assigner assigns the second indices based on the average values of the photographing position data.

The photographing position data may include latitude data and longitude data. The image display apparatus may be further provided with a place name storage device which stores place name data corresponding to the latitude data and the longitude data in correspondence with the latitude data and the longitude data. The position index assigner reads the corresponding place name data from the place name storage device based on the average value of the latitude data and the average value of the longitude data and assigns it as the position index.

The photographing time classifier and the photographing position classifier may apply cluster analysis to the photographing time data and to the photographing position data, respectively, and classify the plurality of image data into the specified number of sets in accordance with a tree diagram created as a result of the cluster analysis.

The image display apparatus may be further provided with a first index assigner which assigns first indices representing the respective first attribute of the sets classified based on the first attribute data; and a second index assigner which assigns second indices representing the respective second attribute of the sets classified based on the second attribute data; a first selector which selects a set from the specified number of sets classified based on the first attribute data upon designation of a first attribute index; and a second selector which selects a set from the specified number of sets classified based on the second attribute data upon designation of a second attribute index.

With these constructions, the digital (or image) data and the first and second attribute data representing the conditions on which the respective digital data were created are stored in correspondence in the data storage device, and the digital data are classified into the specified number of sets based on the first attribute data or the photographing time data while being classified into the specified number of sets based on the second attribute data or the photographing position data. One set is selected from the sets classified based on the first attribute data upon receiving the input from outside, and one set is selected from the sets classified based on the second attribute data upon receiving the input from outside. Further, the product set of the set selected by the first selector and the one selected by the second selector is calculated, and the digital data included in this product set are displayed on the display device. Thus, designations concerning the two attribute data (first and second attribute data) representing the conditions on which the digital data were created can be independently made, and the digital data belonging to the set satisfying the designated two attribute data are displayed. As a result, the digital data desired by a user can be easily searched.

Also, the first indices representing the characteristics of the sets are assigned to each of the sets classified by the first classifier, and the second indices representing the characteristics of the sets are assigned to each of the sets classified by the second classifier. This makes the designation of the set from outside easier, and the digital data desired by the user can be more easily searched.

The first indices and the second indices are displayed in the directions intersecting with each other on the display device. Accordingly, the first index and the second index can be designated by designating one of (i×j) sections arrayed in matrix constituted by the first and second indices displayed on the display device. Thus, the set including the desired digital data can be more easily selected and the digital data desired by the user can be even more easily searched.

The average value of the first attribute data corresponding to the digital data belonging to each of the sets classified by the first classifier, and the average value of the second attribute data corresponding to the digital data belonging to each of the sets classified by the second classifier are calculated. The first index is assigned based on the average value of the first attribute data, whereas the second index is assigned based on the average value of the second attribute data. Since proper indices are assigned based on the average values in this way, the digital data desired by the user can be more easily searched.

Since the digital data are image data, the first attribute data are date data representing the dates on which the respective digital data were created and the second attribute data are position data representing the places where the respective data were created, a digital data searching apparatus capable of searching the image data using the date data and the position data can be realized.

The place name data corresponding to the average value of the latitude data and that of the longitude data is read from the place name storage device and assigned as the second index. Thus, the second index more easily distinguishable by the user can be assigned, with the result that the digital data desired by the user can be even more easily searched.

Cluster analysis is applied to the first and second attribute data, and the digital data are classified into the i sets and into the j sets in accordance with the tree diagram created as a result of cluster analysis. Thus, the i sets and the j sets created by classification are sets similar in terms of the first or second attribute data, thereby conducting proper classifications. Further, since classifications are conducted in accordance with the tree diagrams created as a result of cluster analysis, the digital data can be classified only by changing a cluster distance as a basis for classification even in the case of changing the classification numbers i or j, thereby reducing a calculation load.

Since at least either one of the classification numbers i and j is set upon receiving the input from outside, a degree of freedom in the user's search can be enhanced. For example, if the user has an unclear memory, extended search can be easily made by first setting at least either one of the classification numbers i and j at a small value and gradually increasing the classification numbers i and j while confirming the digital data being displayed.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A digital data searching apparatus, comprising:
    a data storage device which stores a plurality of digital data, and first attribute data and second attribute data representing conditions on which the plurality of digital data are respectively created in correspondence;
    a first classifier which classifies the plurality of digital data into i sets (i is an integer of 2 or larger) based on their respective first attribute data;
    a second classifier which classifies the plurality of digital data into j sets (j is an integer of 2 or larger) based on their respective second attribute data;
    a first selector which selects a set from the i sets;
    a second selector which selects a set from the j sets;
    an extractor which calculates a product set of the set selected by the first selector and the set selected by the second selector; and
    a display controller which is communicatable with a display device for displaying an image, and controls the display device to display digital data included in the product set.

2. A digital data searching apparatus according to claim 1, further comprising:
    a first index assigner which assigns first indices representing the respective characteristics of the i sets; and
    a second index assigner which assigns second indices representing the respective characteristics of the j sets;
    wherein the first and second selector select sets upon designation of a first index and a second index.

3. A digital data searching apparatus according to claim 2, wherein the display controller controls the display device to display the first indices and the second indices in directions intersecting with each other on the display device.

4. A digital data searching apparatus according to claim 2, further comprising:
an average value calculator which calculates an average value of the first attribute data corresponding to the digital data belonging to each of the i sets and calculates an average value of the second attribute data corresponding to the digital data belonging to each of the j sets,
wherein the first index assigner assigns the first indices based on the average values of the first attribute data and the second index assigner assigns the second indices based on the average values of the second attribute data.

5. A digital data searching apparatus according to claim 4, wherein the digital data is image data, the first attribute data is time data representing a date on which the digital data was created, and the second attribute data is position data representing a place where the digital data was created.

6. A digital data searching apparatus according to claim 5, wherein the position data includes latitude data and longitude data, further comprising:
a place name storage device which stores place name data corresponding to the latitude data and the longitude data in correspondence with the latitude data and the longitude data, and the second index assigner reads the corresponding place name data from the place name storage device based on the average value of the latitude data and the average value of the longitude data and assigns it as the second index.

7. A digital data searching apparatus according to claim 1, wherein the first and second classifier apply cluster analysis to the first attribute data and to the second attribute data, respectively, and classify the plurality of digital data into the i sets and into the j sets in accordance with a tree diagram created as a result of the cluster analysis.

8. A digital data searching apparatus according to claim 1, further comprising a classification number setter which sets at least either one of the classification numbers i and j.

9. An image display apparatus comprising:
a storage device which stores a plurality of image data each having photographing time data and photographing position data;
a photographing time classifier which classifies the plurality of image data into a specified number of sets based on their respective photographing time data;
a photographing position classifier which classifies the plurality of image data into a specified number of sets based on their respective photographing position data;
a photographing time selector which selects a set from the specified number of sets classified based on the photographing time data;
a photographing position selector which selects a set from the specified number of sets classified based on the photographing position data; and
a display image output device which outputs a display image for displaying image data included in both the set selected by the photographing time selector and the set selected by the photographing position selector.

10. An image display apparatus according to claim 9, wherein the display image includes:
a photographing time section which extends in a first direction, and is arranged with selective items corresponding to the specified number of sets classified based on the photographing time data;
a photographing position section which extends in a second direction perpendicularly intersecting the first direction, and is arranged with selective items corresponding to the specified number of sets classified based on the photographing position data;
whereby image data included in both the set corresponding to a selected item in the photographing time section and the set corresponding to a selected item in the photographing position section is displayed.

11. An image display apparatus according to claim 9, further comprising;
a time index assigner which assigns position indices representing the respective photographing time of the sets classified based on the photographing time data; and
a position index assigner which assigns position indices representing the respective photographing position of the sets classified based on the photographing position data;
wherein the photographing time selector and the photographing position selector select sets upon designation of a photographing time index and a photographing position index.

12. An image display apparatus according to claim 11, further comprising:
an average value calculator which calculates an average value of the photographing time data corresponding to the image data belonging to each of the sets classified based on the photographing time data and calculates an average value of the photographing position data corresponding to the image data belonging to each of the sets classified based on the photographing position data;
wherein the time index assigner assigns the time indices based on the average values of the photographing time data; and the position index assigner assigns the second indices based on the average values of the photographing position data.

13. An image display apparatus according to claim 11, wherein the photographing position data includes latitude data and longitude data, further comprising:
a place name storage device which stores place name data corresponding to the latitude data and the longitude data in correspondence with the latitude data and the longitude data;
wherein the position index assigner reads the corresponding place name data from the place name storage device based on the average value of the latitude data and the average value of the longitude data and assigns it as the position index.

14. An image display apparatus according to claim 9, wherein the photographing time classifier and the photographing position classifier apply cluster analysis to the photographing time data and to the photographing position data, respectively, and classify the plurality of image data into the specified number of sets in accordance with a tree diagram created as a result of the cluster analysis.

15. An image display apparatus comprising:
a storage device which stores a plurality of image data each having first attribute data and second attribute data;
a first classifier which classifies the plurality of image data into a specified number of sets based on their respective first attribute data;
a second classifier which classifies the plurality of image data into a specified number of sets based on their respective second attribute data; and
a display image output device which outputs a display image including:

a first attribute section which extends in a first direction, and is arranged with selective items corresponding to the specified number of sets classified based on the first attribute data;

a second attribute section which extends in a second direction perpendicularly intersecting the first direction, and is arranged with selective items corresponding to the specified number of sets classified based on the second attribute data;

to thereby display image data included in both the set corresponding to a selected item in the first attribute section and the set corresponding to a selected item in the second attribute section.

16. An image display apparatus according to claim 15, further comprising;

a first index assigner which assigns first indices representing the respective first attribute of the sets classified based on the first attribute data; and a second index assigner which assigns second indices representing the respective second attribute of the sets classified based on the second attribute data;

a first selector which selects a set from the specified number of sets classified based on the first attribute data upon designation of a first attribute index; and a second selector which selects a set from the specified number of sets classified based on the second attribute data upon designation of a second attribute index.

17. An image display apparatus according to claim 16, further comprising:

an average value calculator which calculates an average value of the first attribute data corresponding to the image data belonging to each of the sets classified based on the first attribute data and calculates an average value of the second attribute data corresponding to the image data belonging to each of the sets classified based on the second attribute data;

wherein the first index assigner assigns the first indices based on the average values of the first attribute data; and the second index assigner assigns the second indices based on the average values of the second attribute data.

18. An image display apparatus according to claim 17, wherein the first attribute data is time data representing a date on which the image data was created, and the second attribute data is position data representing a place where the image data was created, the position data including latitude data and longitude data, further comprising:

a place name storage device which stores place name data corresponding to the latitude data and the longitude data in correspondence with the latitude data and the longitude data, and the second index assigner reads the corresponding place name data from the place name storage device based on the average value of the latitude data and the average value of the longitude data and assigns it as the second index.

19. An image display apparatus according to claim 15, wherein the first and second classifier apply cluster analysis to the first attribute data and to the second attribute data, respectively, and classify the plurality of image data into the sets in accordance with a tree diagram created as a result of the cluster analysis.

20. An image display apparatus according to claim 15, wherein the first attribute data relates to photographing time when the image data was created, and the second attribute data relates to photographing position where the image data was created.

* * * * *